Sept. 19, 1933.     R. PORCELLO     1,927,753
AEROPLANE
Filed June 15, 1932

Inventor
Raphael Porcello
By Miller + Miller
Attorneys

Patented Sept. 19, 1933

1,927,753

UNITED STATES PATENT OFFICE 1,927,753

AEROPLANE

Raphael Porcello, Richmond Hill, N. Y.

Application June 15, 1932. Serial No. 617,441

1 Claim. (Cl. 244—14)

This invention relates to an aeroplane and has for an object to provide a novel aeroplane having a greater amount of lifting and propelling power than usual.

A further object of this invention is to provide an aeroplane having tandem wings and tandem propelling means.

Yet an additional object of this invention is to provide an aeroplane having crescent wings and having at least one of the propelling means located within at least one of the crescents.

Yet an additional object of this invention is to provide an aeroplane having a crescent shaped wing located forward of the center of the fuselage and another crescent shaped wing located aft of the center of the fuselage, and to provide tandem propelling means with one of the propellers located forward of the forward wing and the other propeller located aft of the forward wing, but forward of the aft wing.

Yet an additional object of this invention is to provide an aeroplane having a pair of tandem propellers wherein each propeller is operated by an individual motor located side by side on the fuselage.

Figure 1:
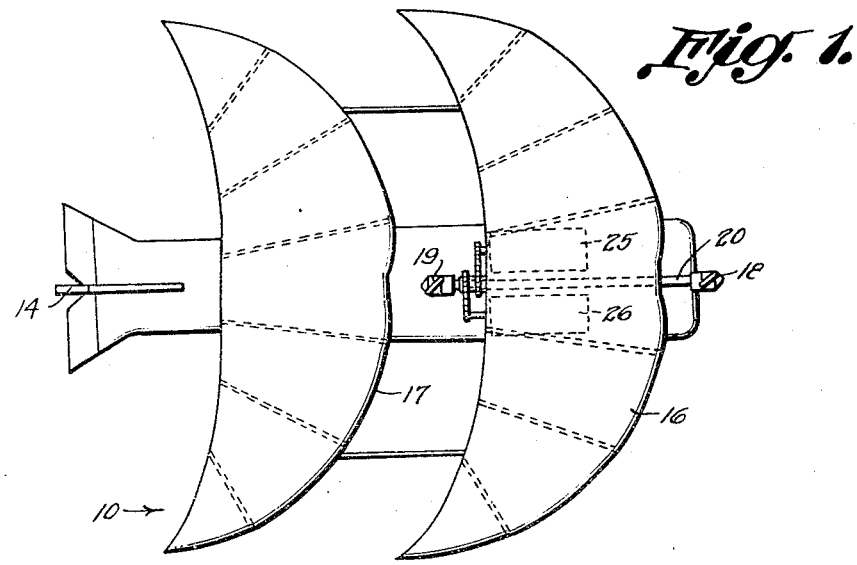
Figure 2:
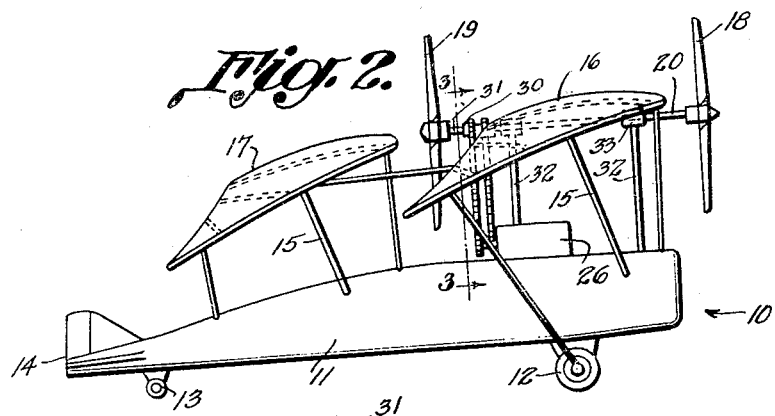
Figure 3:
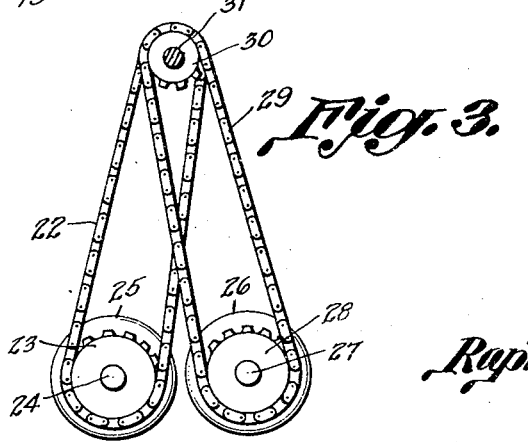

With the foregoing and other objects in view, as will hereinafter become apparent, this invention comprises the constructions, combinations and arrangements of parts, hereinafter set forth, disclosed and shown on the accompanying drawing. In this drawing, Figure 1 is a plan view of the aeroplane showing the arrangement of the propellers and wings, Figure 2 is a a side elevation of same, and Figure 3 is a sectional view taken on line 3—3 of Figure 2, showing clearly the gearing arrangement for the propeller shaft with the two motors.

The aeroplane 10 constituting this invention has a fuselage 11, landing wheels 12, tail wheel 13, and elevator and rudder 14. Supported above the fuselage 11 by suitable struts 15 are a pair of tandem wings 16 and 17, the wings 16 and 17 each being in the shape of a crescent. The wing 16 is located forward of the center of the fuselage 11, while the wing 17 is located aft of the center of the fuselage 11.

The propelling means for this aeroplane 10 consists of a pair of tandem propellers 18 and 19, the propeller 18 being located forward of the wing 16, while the propeller 19 is located forward of the wing 17 but aft of the wing 16, it being observed that the propeller 19 is located within the crescent formed by the wing 16. The propeller 18 is mounted on a propeller shaft 20, having a sprocket 21 thereon for rotation by a sprocket chain 22 cooperating with a sprocket 23 on the power shaft 24 of a motor 25. Another similar motor 26 located side by side with the motor 25 on the fuselage 11 has a power shaft 27 and sprocket wheel 28 operating the sprocket chain 29 for rotating the sprocket gear 30 on the propeller shaft 31 under which the air propeller 19 is mounted.

Suitable supports 32 and bearings 33 are provided for the propeller shaft 20 and 31. In operation, if desired, the propellers 18 and 19 may be of opposite pitch so as to be rotative in opposite directions, whereby the centrifugal effect of each motor will be counterbalanced by the other.

As will be observed in Figure 2, the air propeller 19 draws the air flowing over the forward wing 16 and causes it to flow over the air wing 17, increasing the lifting effect on the aeroplane and on the aeroplane 10 per se.

The novel features and the operation of this device will be apperent from the foregoing description. While the device has been shown and the structure described in detail, it is obvious that this is not to be considered limited to the exact form disclosed, and that changes may be made therein within the scope of what is claimed, without departing from the spirit of the invention.

Having thus set forth and disclosed the nature of this invention, what is claimed is:

An aeroplane comprising a fuselage, a crescent shaped supporting wing located forward of the center of and above said fuselage, a tandem crescent shaped supporting wing located aft of the center of and above said fuselage, a propeller located forward of and in alignment with the center of said forward wing, and a second propeller located aft of said forward wing and forward of said aft wing and in alignment with said forward propeller and said wing, said second propeller being within the crescent of said forward wing, and an individual motor for operating each propeller, said motors being located side by side on said fuselage.

RAPHAEL PORCELLO.